United States Patent
Fiacco

[19]

[11] Patent Number: 6,131,863
[45] Date of Patent: Oct. 17, 2000

[54] UNIVERSAL MOUNTING SYSTEM

[76] Inventor: Paul Fiacco, 1134 Armstrong Ct., Derby, Kans. 67037

[21] Appl. No.: 09/226,979

[22] Filed: Jan. 8, 1999

[51] Int. Cl.[7] .................................................. F16M 11/00
[52] U.S. Cl. .......................................... 248/200; 248/342
[58] Field of Search .................................. 248/342, 603, 248/200; 417/363, 360, 423.15; 416/244 R, 246, 204 R, 205, 207, 5, 178

[56] References Cited

U.S. PATENT DOCUMENTS

| | | | |
|---|---|---|---|
| 5,489,191 | 2/1996 | Tai | 416/5 |
| 5,577,695 | 11/1996 | Ruckwardt | 248/200 |
| 5,873,701 | 2/1999 | Shiu | 416/205 |
| 5,944,487 | 8/1999 | Pearce | 416/244 R |
| 6,048,173 | 4/2000 | Chen | 416/210 R |
| 6,062,820 | 5/2000 | Wang | 416/210 R |

*Primary Examiner*—Anita M. King
*Assistant Examiner*—Naschica Sanders
*Attorney, Agent, or Firm*—Shook, Hardy & Bacon L.L.P.

[57] ABSTRACT

A universal mounting system is disclosed. The system includes an adaptor, which includes a mounting plate having a center. A common aperture is positioned on the mounting plate at a selected distance from the center. Sets of apertures, each set including the common aperture, are formed in the plate at the selected distance from the center and are positioned angularly equidistant from one another. The system further includes a number of arms corresponding to the number of radial holes in the motor equally spaced from one another. The first ends of the arms are attached to the selected set of apertures corresponding to the number of radial holes in the motor. The second ends of the arms are attached to the corresponding radial holes of the rotor plate to secure the adaptor to the motor. An accessory is mounted to the adaptor. The method includes attaching the first ends of the support arms to the mounting plate at the desired set of apertures corresponding to the number of radial holes in the motor, then aligning the second ends of the support arms with the radial holes, and finally fastening the support arms to the radial holes.

18 Claims, 2 Drawing Sheets

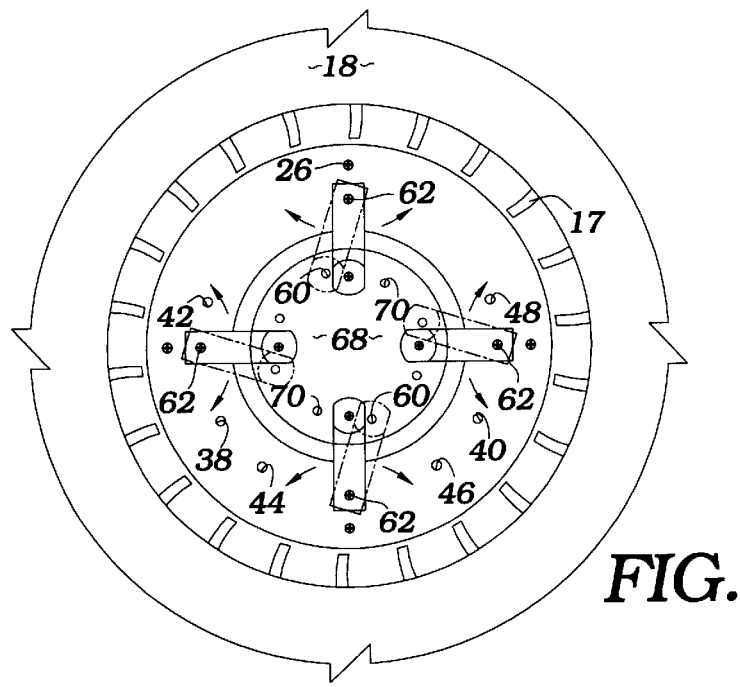
FIG. 6.
FIG. 7.
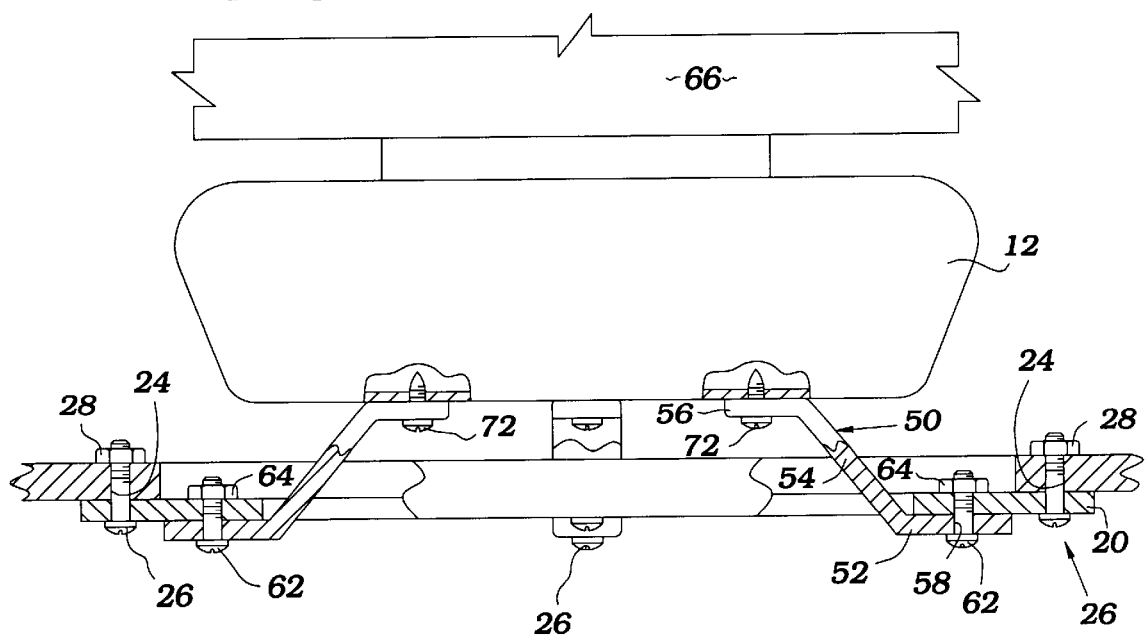

UNIVERSAL MOUNTING SYSTEM

The present invention relates to a universal mounting system and, more particularly, to an adaptor for securing accessories to rotary motors with varying configurations of radial mounting points.

BACKGROUND OF THE INVENTION

Rotary motors are utilized in a wide number of devices. One such device is the common ceiling fan. Generally, a ceiling fan motor drives a number of radially extending fan blades that propel or impel air within a room. The fans arms are attached to the rotary motor at a ceiling fan rotor plate which is coupled to the output shaft of the motor. Each fan arm is secured to the rotor plate with a fan arm bracket having two apertures. The rotor plate contains a number of radial holes drilled in closely spaced pairs which serve as mounting points for the blades. Each pair includes a first and second hole positioned at a selected distance from the center of the rotor plate. If the fan motor is designed for four fan arms, four pairs of holes are drilled at an equal distance from the center of the shaft. The radius of the first hole in each pair is offset 90° from the radii of the first holes of the adjacent pairs. Similarly, the radius of the second hole of each pair is offset 90° from the second holes of the adjacent pairs. Essentially, the first holes of each pair and the second holes of each pair are angularly equidistant from the corresponding first and second holes of the other pairs. If the fan motor is designed for five arms, five pairs of holes are drilled in the rotor plate so that the angle between the radius of first and second holes and the radii of the corresponding first and second holes of the adjacent pairs is 72°. Similarly, if the ceiling fan is designed for three fan blades, the first and second holes of each pair are positioned at 120° angles from the corresponding first and second holes of the adjacent pairs. To assemble the fan blades to the motor, the apertures of the fan arm brackets are aligned with the pairs of radial holes and are attached by screws received within the rotor plate.

The placement of the radial holes in the rotor plate provides an effective and simple means for attaching fan blades to the ceiling fan motor. However, the varying configurations of radial holes are not easily adaptable for mounting accessories otherwise suitable for use with all types of ceiling fan motors. For instance, pending U.S. patent application Ser. No. 08/953,598, filed Oct. 17, 1997, which is hereby incorporated in its entirety by reference, discloses an air filter accessory that may be driven by a wide variety of ceiling fan motors. However, the placement of the attachment apertures on the air filter accessory is dictated by the number and configuration of radial holes in the rotor plate of the fan motor. Thus, a different model of air filter accessory might be required for each different model of ceiling fan rotor plate. Producing a number of different models would result in a number of unnecessary inefficiencies. If a separate accessory is needed for each different ceiling fan motor, the cost of production of the accessories is increased, maintaining inventory becomes more difficult, and purchasers are required to select the model of air filter accessory that matches their existing ceiling fan motor. Thus, a universal mounting adaptor is needed to mount accessories to rotary motors and, particularly, to ceiling fan motors having different patterns of radial holes.

SUMMARY OF THE INVENTION

It is therefore an object of the present invention to provide a universal mounting adaptor to secure accessories to rotary motors having various numbers of radial holes.

A further object of this invention is to provide a universal mounting adaptor to secure accessories to rotary motors having radial holes positioned at different distances from the center of the rotating shaft.

Another object of this invention is to provide a universal mounting adaptor to mount various accessories to ceiling fan motors with varying configurations of radial holes.

Still another object of the invention is to provide a method for mounting an accessory to a rotary motor using a universal mounting adaptor.

To accomplish these and other related objects, the present invention provides a universal mounting system. The system includes a mounting plate having a center. A common aperture is positioned on the mounting plate at a selected distance from the center. Sets of apertures, each set including the common aperture, are formed in the plate at the selected distance from the center and are positioned angularly equidistant from one another. The adaptor further includes a number of arms corresponding to the number of radial holes or mounting points in the motor equally spaced from one another. The first ends of the arms are attached to the selected set of apertures corresponding to the number of radial holes in the motor. The second ends of the arms are attached to the corresponding radial holes of the rotor plate to secure the adaptor to the motor. An accessory is mounted to the adaptor.

The present invention also provides a method for mounting an accessory to a rotary motor using a universal mounting adaptor. The method includes attaching the first ends of the support arms to the mounting plate at the desired set of apertures corresponding to the number of radial holes in the motor, then aligning the second ends of the support arms with the radial holes, and finally fastening the support arms to the radial holes.

Additional objects, advantages and novel features of the invention will be set forth in part in a description which follows, and in part will become apparent to those skilled in the art upon examination of the following, or may be learned by practice of the invention.

BRIEF DESCRIPTION OF THE DRAWINGS

In the accompanying drawings form a part of this specification and are to be read in conjunction therewith. Like reference numerals are used to indicate like parts in the various views:

FIG. 6 is a bottom plan view of the universal mounting adaptor of FIG. 1 demonstrating the arms in the rotated position; and FIG. 7 is a side elevation view of the universal mounting adaptor with portions broken away to show details of construction.

DETAILED DESCRIPTION OF THE PREFERRED EMBODIMENT

Figure 1:
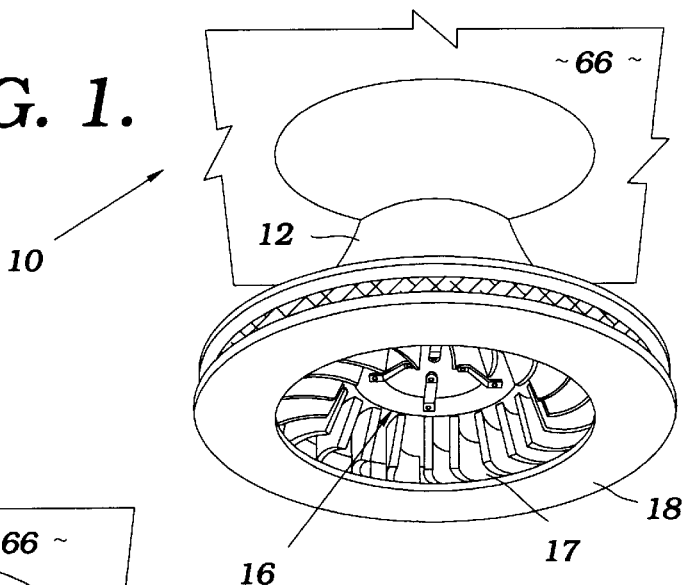
FIG. 1 is a bottom perspective view of a ceiling fan accessory employing the universal mounting of the present invention.
Figure 2:
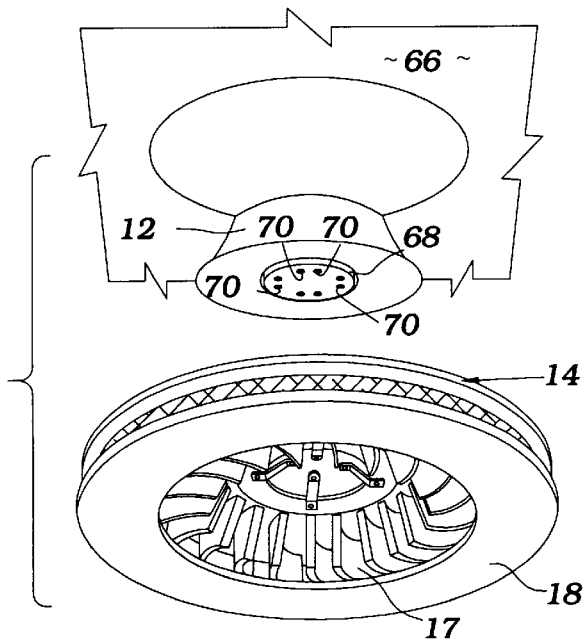
FIG. 2 is an exploded bottom perspective view similar to FIG. 1 showing the rotor plate of the ceiling fan motor.

Referring to the drawings in greater detail, and initially to FIGS. 1 and 2, a ceiling fan accessory assembly is designated generally by the numeral 10. Assembly 10 includes a ceiling fan motor 12, an air filter accessory 14, and a universal mounting adaptor 16.

The blades of the ceiling fan are removed so that the air filter accessory 14 may be attached to the motor 12. The preferred air filter accessory is disclosed in U.S. patent application Ser. No. 08/953,598, which is hereby incorporated in its entirety by reference. When air filter accessory 14 is rotated at a sufficient speed, a plurality of blades 17 positioned on the interior wall of the air filter accessory 14 impel air from the room towards the cylindrical air filter 18. As air passes through air filter 18, unwanted particles suspended in the air are removed. The filtered air is directed radially out of filter 18 and back into the room.

The air filter accessory 14 is attached to the universal mounting adaptor 16 at a mounting plate 20. In the preferred embodiment, mounting plate 20 is an annular ring secured to the upper portion of accessory 14. Mounting plate 20 includes an inner edge 21 which defines a central opening to receive a shaft (not shown) for attaching light fixtures. However, if the fan motor 12 does not include a central light shaft or the shaft is removed before attaching the accessory 14, the mounting plate may be a solid shape, such as a disc. The mounting plate 20 may also be formed from a variety of non-circular shapes with or without a central opening. Alternatively, the mounting plate 20 may be formed integrally with the accessory 14.

Figure 3:
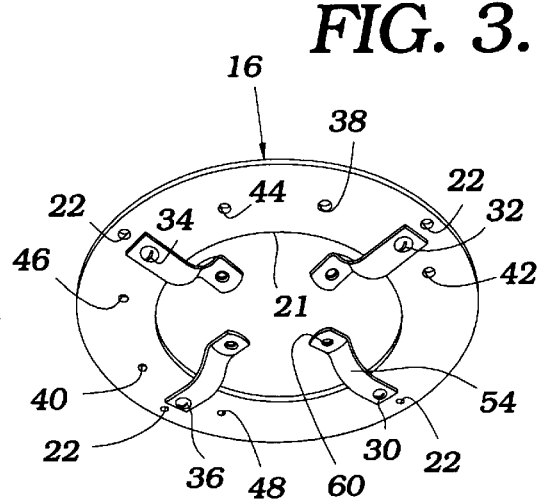
FIG. 3 is a bottom perspective view of the universal mounting adaptor of the present invention.

As best shown in FIGS. 3 and 6, a plurality of accessory fastening apertures 22 are positioned on the mounting plate 20 of the adaptor 16 to correspond with the mounting apertures 24 on accessory 14. In the preferred embodiment, each of the four mounting apertures 24 is positioned at a selected distance from the center of mounting plate 20 and at an equal arc distance from the next adjacent mounting apertures 24. A plurality of bolts 26 are inserted in mounting apertures 24 and accessory fastening apertures 22, and cooperate with nuts 28 to firmly secure adaptor 16 to accessory 14. Importantly, several other patterns of matching apertures may be utilized to secure the accessory 14 to the mounting plate 20.

The accessory 16 and mounting plate 20 may be secured to one another by any other suitable means. A number of other fastening means such as rivets, snaps and screws may be used to secure accessory 14 to adaptor 16 with or without apertures 22 and 24. Also, the entire mounting plate 20 could be frictionally fit within the opening in the accessory.

The mounting plate 20 is preferably made of stainless steel or aluminum, but may also be produced from other metals, wood, durable plastics, or any number of other sufficiently rigid materials. If the plate is formed integrally with the accessory, the plate is preferably produced from the same material as the accessory, but may be made from a different material and permanently attached to the accessory by welding or other permanent fastening means.

Figure 5:
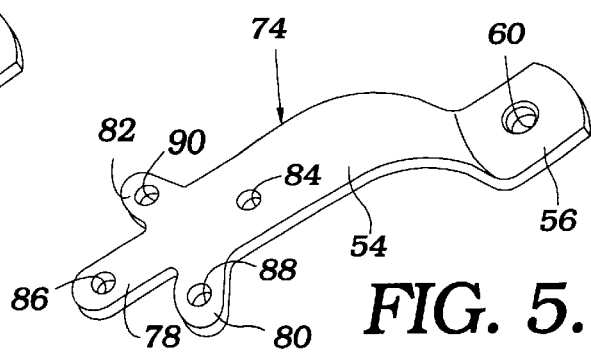
FIG. 5 is a top perspective view of an alternative support arm of the universal mounting adaptor of the present invention.

As best shown in FIGS. 3 and 5, a plurality of sets of apertures are formed in mounting plate 20 for mounting the adaptor 16 to the ceiling fan motor 12. A common aperture 30 is placed at a selected distance from the center of mounting plate 20. The first set of apertures is adapted for use with a four-bladed ceiling fan motor. The first set of apertures includes common aperture 30 and apertures 32, 34 and 36. Apertures 32, 34 and 36 are positioned on mounting plate 20 at the same distance from the center as common aperture 30 and are angularly equidistant from one another and common aperture 30 so that the arc distance between each aperture is equal. Thus, the radii of the apertures in the first set are offset 90° from the radii of the adjacent apertures.

The second set of apertures is adapted for use with a three-bladed ceiling fan. The second set of apertures includes common aperture 30 and apertures 38 and 40. Apertures 38 and 40 are formed in mounting plate 20 at the same distance from the center of mounting plate 20 as common aperture 30. The second set of apertures are angularly equidistant from one another, and are arranged so that the radii are offset from one another at 120° angles.

The third set of apertures is adapted for use with a five-bladed ceiling fan. The third set of apertures includes apertures 42, 44, 46, 48 and common aperture 30. Like the apertures in the first two sets, the apertures in the third set are positioned at an equal distance from the center and are angularly equidistant from one another. The radii are offset by 72°. The preferred embodiment includes three sets of apertures. However, additional sets of apertures having virtually any number of equally spaced apertures may be formed in mounting plate 20 and are within the scope of the present invention.

The apertures are preferably placed in mounting plate 20 by a conventional drill press. The apertures also may be punched or otherwise cut in the mounting plate. Further, if the mounting plate 20 is formed by injection molding, the apertures may be formed as voids in the mounting plate 20 during the molding process.

Figure 4:
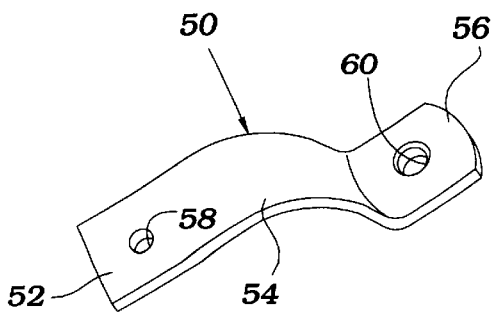
FIG. 4 is a top perspective view of a mounting arm of the universal mounting adaptor of the present invention.

A plurality of support arms 50 secure motor 12 to mounting plate 20 at a selected set of apertures. Arms 50 are preferably made from a machineable metal, but may be formed from any other appropriately rigid material such as wood or plastic. As best shown in FIG. 4, in the preferred embodiment each arm 50 includes a lower base section 52, a neck 54, and an upper section 56. Lower base section 52 is generally rectangular and includes an aperture 58. Neck 54 extends upwardly from base section 52 to upper section 56. Neck 50 is preferably arcuate and upwardly concave. Upper section 56 is generally flat and terminates in a curvilinear end. An aperture 60 is positioned in upper section 56.

Turning now to FIG. 3, the arms are preferably secured to the bottom of mounting plate 20 by a suitable fastening means, such as by bolting. Neck 54 extends upwardly through the opening in mounting plate 20. The angle between the neck 54 and sections 52 and 56 may be varied depending on the combined width of the plate 20 and accessory 14 and the amount of clearance desired between the motor 12 and accessory 14. Alternatively, the arms 50 may be secured to the top of mounting plate 20, particularly if the plate 20 does not include a central opening.

As shown in FIG. 7, a bolt 62 is inserted in aperture 58 of bottom section 52. The bolt 62 extends through one of the apertures on the mounting plate, and is secured by a nut 64 at the top of plate 20. Preferably, the arms 50 are allowed to pivot about the shaft of bolt 62 in the plane parallel to the surface of the mounting plate 20. As designated by the arrows in FIG. 6, each arm 50 may pivot in either the clockwise or counterclockwise directions.

The ceiling fan motor 12 is shown in FIG. 2. Ceiling fan motor 12 is fixably secured to the ceiling 66 as commonly known in the art. In use, ceiling fan motor 12 rotates the rotor plate 68 at a constant speed. Generally, one or more mounting points, preferably radial mounting holes 70, are drilled in the rotor plate 68 to secure each ceiling fan blade to the ceiling fan motor 12. It is to be understood that mounting points can be apertures, holes, bolts, snap ridges or any other mechanism capable of removably securing components to the plate 68.

Generally, the radial mounting holes 70 are positioned in groups with each mounting hole 70 equally spaced from the other mounting holes in the group. In the typical ceiling fan, as described above and shown in FIG. 2, the radial mounting holes 70 are oriented in pairs and positioned in the rotor plate 68 at a selected distance from the center of the plate. The first holes of each pair are angularly equidistant from one another. Similarly, the second holes of each pair are spaced at an equal arc distance from one another.

As best shown in FIG. 6, each arm 50 is secured at upper section 56 to rotor plate 68. The arms 50 may be secured to the radial holes 70 by any suitable fastening means. In the preferred embodiment, a screw 72 extends upwardly through aperture 60 of each arm 50 and is received within one of the radial holes 70 of the rotor plate 68.

In operation, the user selects the number of support arms 50 corresponding with the number of radial holes 70 in the ceiling fan rotor plate 68 spaced equally from one another. In the typical ceiling fan, the number of arms 50 correspond with the number of fan blades for which the motor was designed. Thus, for each pair of apertures 70, one support arm 50 is utilized. If the rotor plate 68 has three pairs of radial holes 70, support arms 50 are attached at the second set of apertures 30, 38, and 40. Similarly, if the rotor plate 68 contains four pairs of radial holes 70, the arms 50 are secured to the first set of apertures 30, 32, 34 and 36. Finally, for rotary motors having five pairs of radial holes 70, apertures 30, 42, 44, 46 and 48 of the third set are used.

As best shown in FIG. 5 and 6, the upper sections 56 of support arms 50 are rotated about bolts 62 to vary the distance between the aperture 60 and the center of the rotor plate 68. Specifically, as arm 50 is rotated away from the radial line between the center of the mounting plate 20 and bolt 62, the distance between aperture 60 and the center of the of mounting plate is increased. Thus, arms 50 of one length may adjustably fit rotary motors 12 having radial holes 70 at various distances from the center of the rotor plate 68. As indicated by the phantom lines in FIG. 6, all four of the arms 50 may be offset at the same angle to adapt to motors having radial holes 70 at a distance from the center of rotor plate 68 equal to the distance between each aperture 60 of the offset arms 50 and the center of mounting plate 20.

In the preferred embodiment, each support arm 50 may be rotated until the edge of the arm 50 contacts inner edge 21 of mounting plate 20. Thus, the distance between the center of the mounting plate 20 and the aperture 60 may be varied to a greater degree if the width of the support arms is relatively narrow. Arms of different distances may be necessary to adapt the mounting plate 20 to radial holes 70 falling outside the range of rotation of support arms 50. For instance, a few sets of support arms of various lengths may be provided with the mounting plate 20 so that the accessory 14 may be mounted to a wide variety of ceiling fan motors 12. If the support arms 50 are mounted to the top of mounting plate 20, the arms 50 are free to rotate 360° about bolts 62, and the adaptor 16 may accommodate a greater variety of rotor plates.

Once the arms 50 are rotated to correspond to the rotor plate 68, the arms 50 are aligned with either the first or second holes of each pair of radial holes 70. Screws 72 are inserted through apertures 60 of each support arm 50 and are secured within the rotor plate 68 at radial holes 70. Then, nuts 64 on bolts 62 are tightened so that the arms 50 do not rotate when the motor is running. When the motor 12 is activated, the air filter accessory 14 begins to rotate, and the air filtration process begins.

With reference to FIG. 5, an alternative support arm 74 is shown. The same reference numerals used in FIGS. 3, 4 and 6 are used to indicate like structures in FIG. 5. Support arm 74 is substantially identical to arm 50 except that arm 74 has an irregularly shaped lower base section 76. The decorative lower base section 76 terminates at a finger 78 surrounded by a pair of lobes 80, 82. An aperture 84 is positioned in section 76 near neck 54, and an aperture 86 is positioned near the center of finger 78. An aperture 88 is placed in lobe 80. Also, an aperture 90 is positioned in lobe 82 at a position closer to aperture 60 than aperture 88. In operation, each arm 74 is secured to mounting plate 20 at one of the four apertures on lower base section 76. Once attached by nuts 62 and bolts 64, the arms 74 may be rotated to fit rotor plate 68. Since each aperture is spaced at a different distance from aperture 60 of upper section 56, support arms 74 may be adapted to fit a greater variety of different rotor plates than support arms having only one mounting aperture on the lower base section. While four apertures are positioned in lower base section 76 of support arm 74 in the alternative embodiment, any number of apertures may be drilled in the lower base section at a variety of different positions. Also, the design of the bottom section may be varied depending on the configuration of apertures and the desired appearance of the arms.

Importantly, the universal mounting adaptor 16 may also be used to mount a number of other accessories to rotary ceiling fan motors such as decorative mobiles, aromatic devices, and other type of air filters. Additionally, the adaptor 16 may be used to mount accessories to other types of rotary motors having at least one group of radial mounting points positioned angularly equidistant from one another. Moreover, the present system could be used to attach components to plates mounted to rotating shafts, such as wheels to axle plates on motor vehicles. In such an application, the axle plates of the vehicle would provide rotation and the lug bolts would provide the mounting points for the adaptor. The present adaptor system would allow the mounting of virtually any wheel to the vehicle.

From the foregoing, it will be seen that this invention is one well adapted to attain all the ends and objects hereinabove set forth together with other advantages which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed:

1. A universal mounting system for securing accessories to a rotation imparting source having a number of mounting points, equally spaced from one another:

a mounting plate having a center;

a common aperture formed on said plate at a selected distance from said center;

a plurality of sets of apertures, each set of apertures including said common aperture and a number of other apertures formed on said plate at said selected distance from said center, said apertures in each said set positioned angularly equidistant from one another; and a selected number of arms, the number of arms corresponding to the number of mounting points in the source, said arms having a first end removably attachable to one of said sets of apertures and a second end removably attachable to the source at the mounting points, whereby a user can attach the said plate to any rotation imparting source by securing said arms to said set of apertures which corresponds to the number of mounting points in the source.

2. The universal mounting system of claim 1 wherein said first end of each said arm includes at least one mounting point, said first end removably attached to said mounting plate at said mounting point.

3. The universal mounting system of claim 2 wherein said first end includes a plurality of mounting points.

4. The universal mounting system of claim 3 wherein at least one of said mounting points is positioned further from said second end of each said arm than at least one other of said mounting points.

5. The universal mounting system of claim 1 wherein each said arm is pivotally attached at said first end to said plate wherein each said arm rotates about said first end so that the distance between said center and said second end is variable.

6. The universal mounting system of claim 1 wherein said sets have three, four, and five apertures.

7. The universal mounting system of claim 1 wherein said arms are arcuate.

8. The universal mounting system of claim 1 wherein said plate is formed integrally with the accessory.

9. The universal mounting system of claim 1 wherein said plate has a central opening.

10. A universal mounting system for mounting an accessory to a rotary ceiling fan motor having a plurality of pairs of radial holes, each pair being equally spaced from one another, comprising:

a mounting plate having a center;

a common aperture formed on said plate at a selected distance from said center;

a plurality of sets of apertures, each set of apertures including said common aperture and a number of other apertures formed on said plate at said selected distance from said center, said apertures in each said set positioned angularly equidistant from one another; and a selected number of arms, the number of arms corresponding to the number of pairs of radial holes in the motor, said arms having a first end removably attachable to one of said sets of apertures and a second end removably attachable to the motor at a first hole of each pair of the radial holes, whereby a user can attach the mounting plate to any rotary ceiling fan motor by securing said arms to said set of apertures which corresponds to the number of pairs of radial holes in the motor.

11. The universal mounting system of claim 10 wherein each said arm is pivotally attached at said first end to said plate wherein each said arm rotates about said first end so that the distance between said center and said second end is variable.

12. The universal mounting system of claim 10 wherein said sets have three, four, and five apertures.

13. The universal mounting system of claim 10 wherein said arms are arcuate.

14. The universal mounting system of claim 10 wherein said plate is formed integrally with the accessory.

15. The universal mounting system of claim 10 wherein said plate has a central opening.

16. The universal mounting system of claim 10 wherein said first end of each said arm includes at least one mounting point, said first end removably attached to said mounting plate at said mounting point.

17. The universal mounting system of claim 16 wherein said first end includes a plurality of mounting points.

18. The universal mounting system of claim 17 wherein at least one of said mounting points is positioned further from said second end of each said arm than at least one other of said mounting points.

* * * * *